US006910149B2

(12) United States Patent
Perloff et al.

(10) Patent No.: US 6,910,149 B2
(45) Date of Patent: Jun. 21, 2005

(54) MULTI-DEVICE LINK AGGREGATION

(75) Inventors: Ronald S. Perloff, Poway, CA (US); Anderson H. Frederik, Vaerloese (DK); Thrysoee J. Christian, Soeborg (DK)

(73) Assignee: Intel Corporation, Santa Clara, CA (US)

( * ) Notice: Subject to any disclaimer, the term of this patent is extended or adjusted under 35 U.S.C. 154(b) by 450 days.

(21) Appl. No.: 09/961,471

(22) Filed: Sep. 24, 2001

(65) Prior Publication Data

US 2003/0061533 A1 Mar. 27, 2003

(51) Int. Cl.[7] .............................................. G06F 11/00
(52) U.S. Cl. ........................................ 714/4; 370/216
(58) Field of Search ...................... 714/4, 43; 709/239; 370/216, 217, 218, 219, 220, 221, 225, 226, 227, 228, 242, 244, 245

(56) References Cited

U.S. PATENT DOCUMENTS

| | | | |
|---|---|---|---|
| 6,104,697 A | | 8/2000 | Kwon |
| 6,169,744 B1 | | 1/2001 | Grabelsky et al. |
| 6,252,849 B1 | | 6/2001 | Rom et al. |
| 6,639,895 B1 | * | 10/2003 | Helles et al. ............... 370/219 |
| 2002/0110148 A1 | * | 8/2002 | Hickman et al. ........... 370/475 |
| 2003/0016624 A1 | * | 1/2003 | Bare ........................... 370/217 |
| 2003/0097470 A1 | * | 5/2003 | Lapuh et al. ............... 709/239 |
| 2004/0022185 A1 | * | 2/2004 | Wils et al. ................. 370/226 |
| 2004/0133693 A1 | * | 7/2004 | Wils et al. ................. 709/230 |

OTHER PUBLICATIONS

Jim Kuciel, Link Aggregation with 802.3ad, Network World Nov. 13, 2000, www.itworld.com/Net/1750/nwwo1113tech/.

IEEE Std. 802.3, 2000 Edition, Part 3: Carrier sense multiple access with collision detection (CSMA/CD) access method and physical layer specifications, Chapter 43, Link Aggregation, pp. 1215–1278.

Jeff Caruso, Building the Bulletproof Ethernet, Network World, Nov. 22, 1999, www.nwfusion.com/archive/1999/81050_11–22–1999.html.

* cited by examiner

Primary Examiner—Scott Baderman
(74) Attorney, Agent, or Firm—Blakely, Sokoloff, Taylor & Zafman LLP

(57) ABSTRACT

The invention relates to multi-device link aggregation (MDLA). A first MDLA device is connected to a second MDLA device by an MDLA internal link. Each of the interconnected first and second MDLA devices is connected to at least one common link aggregation (LAG) partner device by an aggregated link, respectively. Typically, the first and second MDLA devices exchange protocol data units (PDUs) to detect devices that are connected to both the first and second MDLA devices such that they are able to trick the detected devices into behaving as though the two MDLA devices are a single device. If one of the MDLA devices fails, traffic of the associated aggregated link to the failed MDLA device can be automatically forwarded by the other non-failed MDLA device.

35 Claims, 8 Drawing Sheets

MULTI-DEVICE LINK AGGREGATION

BACKGROUND

1. Field of the Invention

This invention relates to communications in networks. In particular, the invention relates to multi-device link aggregation (MDLA), which allows any partner device that employs the IEEE 802.3ad standard for link aggregation to transparently connect aggregated links to a pair of devices supporting MDLA as though they were a single device that also supports the IEEE 802.3ad standard, thereby providing "box-level" redundancy.

2. Description of Related Art

Networks transmit computer information such as computer data between various computer systems operably coupled to the information network. One type of information network is a local area network (LAN). Local Area Networks ("LANs") operate using a variety of data link layer protocols. As is known in the art, the Open Systems Interconnection ("OSI") model is used to describe networks. The OSI model consists of seven layers including, from lowest-to-highest, a physical, data link, network, transport, session, application and presentation layer. The physical layer transmits bits over a medium. The data link layer establishes and maintains point-to-point connections for the transmission of data frames.

One series of standards for LANs is defined by the Institute of Electrical and Electronic Engineer's ("IEEE's") 802 standards. These standards have found widespread acceptability and now form the core of most LANs. A popular variation on one of the IEEE standards, IEEE Std. 802.3, 2000 Edition, is known as "Ethernet." Generally, Ethernet, like the 802.3 standard, is a shared media LAN utilizing a linear serial bus and uses a scheme for managing the LAN known as Carrier Sense Multiple Access with Collision Detection ("CSMA/CD"). CSMA/CD prevents two computers on the LAN from trying to transmit at the same time (or more correctly to ensure that both computers retransmit any frames which are corrupted by simultaneous transmission). CSMA/CD is organized around layered protocols that include a data link layer with a Logical Link Control ("LLC") sub-layer and a Medium Access Control ("MAC") sub-layer. The LLC sub-layer handles logical links between stations while the MAC controls access to a transmission medium via a physical layer.

Ethernet networks can also be connected in "hub and spoke" fashion with a switch or repeater device acting as the hub and individual devices connected at the other end of individual links. The newer, faster, versions of the network generally employ the hub and spoke approach rather than the bus connection.

Link aggregation is the bundling of multiple links into a single aggregated logical link with greater aggregate data bandwidth. An advantage of link aggregation is that it provides more bandwidth than a single link and it provides redundancy in the case of the failure of one or more of the participating links. For example, a user could set up four 100 M bit/second Fast Ethernet connections running in parallel between two switches, but both switches would handle the traffic as if there were a single 400 M bit/second link between them.

The IEEE 802.3ad standard defines a Link Aggregation Control Protocol (LACP) for use by the control process within each device employing link aggregation to verify configurations and to send packets through each of the links within the aggregated logical link. The standard also provides mechanisms for adding and subtracting links from the aggregated logical link. In particular, the IEEE 802.3ad standard for Link Aggregation defines an optional Link Aggregation sublayer for use with CSMA/CD MACs that allows one or more links to be aggregated together to form a Link Aggregation Group, such that a MAC client can treat the Link Aggregation Group as if it were a single link. The IEEE 802.3ad standard works at a variety of speeds. Particularly, the IEEE 802.3ad standard applies to 10 M, 100 M, and 1000 M bit/second speeds and aggregated links can use a combination of these speeds on a single logical link. Furthermore, users can establish multi-gigabit links thereby providing substantially increased bandwidth. The standard will also work with yet higher speeds as they become available.

Moreover, the IEEE 802.3ad specification for Link Aggregation Control Protocol (LACP) further defines how connections can be combined to load share, load balance, and provide better resiliency for high-bandwidth network connections. The IEEE 802.3ad link aggregation standard provides inherent automatic redundancy. In other words, should one of the multiple links used in an aggregated group of links fail, network traffic is dynamically redirected to flow across the remaining good links in the group. The redirection is triggered when the control process within a device (e.g. a switch) determines that the device on the other end of a physical link is no longer receiving information on that link. It then dynamically reassigns the traffic to the remaining link or links in the group and continues to do so until it determines that the device at the other end of the failed physical link is once again able to receive data on that link.

However, even though the IEEE 802.3ad Link Aggregation Control Protocol (LACP) standard provides increased bandwidth via link aggregation and some amount of resiliency by providing redundancy in the case of a link failure, it unfortunately cannot provide the redundancy needed by today's networks used by businesses, hospitals, the military, etc., that cannot afford to shut down or lose data, due to the complete failure of a network device, such as a switch.

BRIEF DESCRIPTION OF THE DRAWINGS

The features and advantages of the present invention will become apparent from the following description of the present invention in which.

DESCRIPTION

Figure 1:
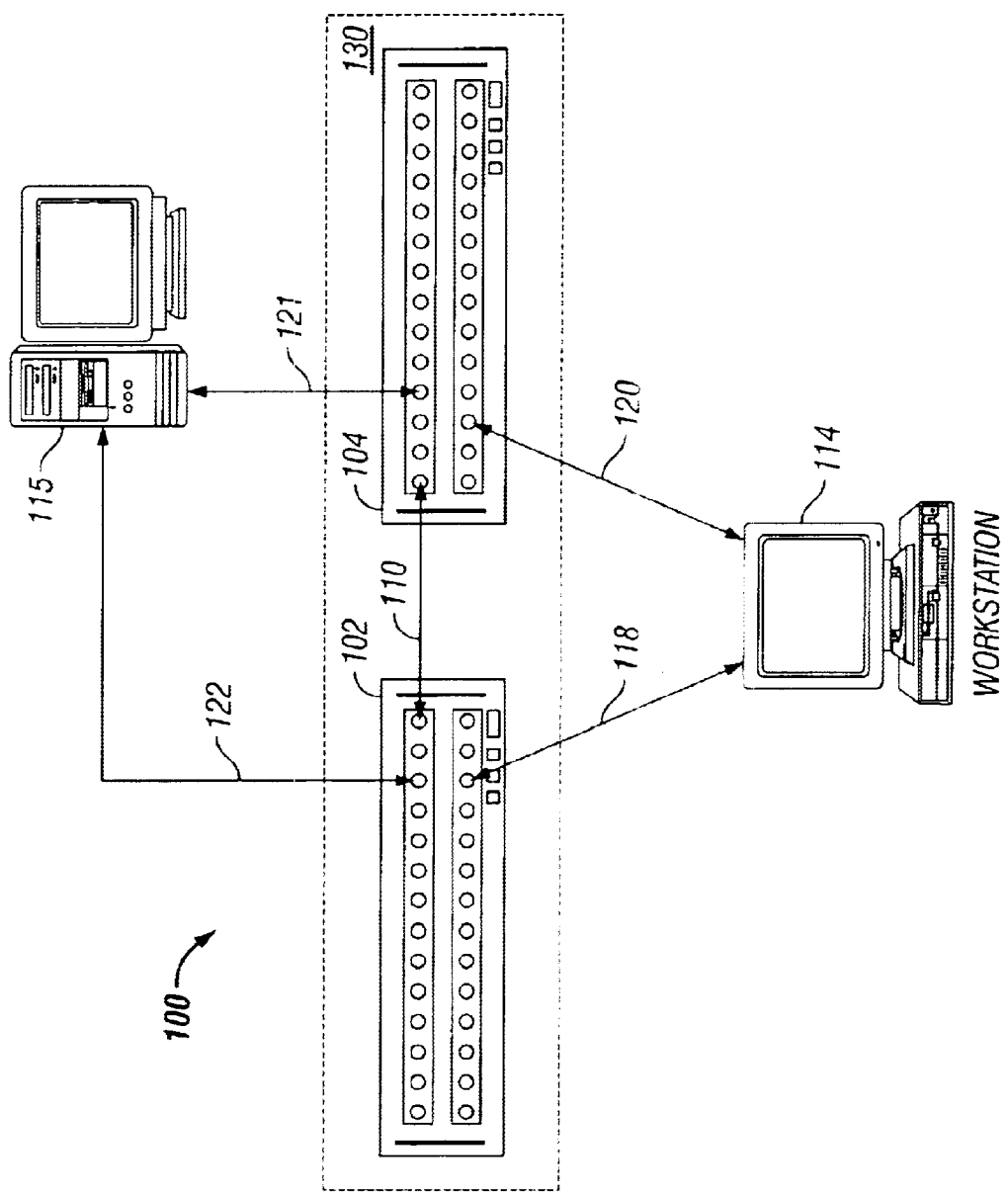
FIG. 1 is a diagram illustrating a system employing multi-device link aggregation (MDLA) according to one embodiment of the invention.

The invention relates to multi-device link aggregation (MDLA). More particularly, embodiments of the invention relate to a system, device, machine-readable medium, and method, which allow any link aggregation (LAG) partner device to transparently connect aggregated links to a pair of devices supporting MDLA as if the common LAG partner device is merely connecting to a single device. In one embodiment, an MDLA device is a multi-port device, such as a switch. Moreover, in particular embodiments, a common LAG partner device supports Institute of Electrical and Electronic Engineers ("IEEE") Std. 802.3ad, 2000 Edition, Link Aggregation Control Protocol (LACP) to transparently connect aggregated links to two MDLA devices, which also support IEEE 802.3ad LACP, thus increasing the guarantee for connectivity between the partner device and a network. Thus, if one of the MDLA devices were to fail, data traffic of the associated aggregated link to the failed MDLA device can be automatically forwarded by the other non-failed MDLA device. After the failed MDLA device is repaired, the system is automatically restored to the same configuration as prior to the failure of the MDLA device. Generally, embodiments of the present invention operate within a network.

In the following description, the various embodiments of the present invention will be described in detail. However, such details are included to facilitate understanding of the invention and to describe exemplary embodiments for employing the invention. Such details should not be used to limit the invention to the particular embodiments described because other variations and embodiments are possible while staying within the scope of the invention. Furthermore, although numerous details are set forth in order to provide a thorough understanding of the present invention, it will be apparent to one skilled in the art that these specific details are not required in order to practice the present invention. In other instances details such as, well-known methods, types of data, protocols, procedures, components, networking equipment, electrical structures and circuits, are not described in detail, or are shown in block diagram form, in order not to obscure the present invention. Furthermore, aspects of the invention will be described in particular embodiments but may be implemented in hardware, software, firmware, middleware, or a combination thereof.

In the following description, certain terminology is used to describe various features of the present invention. In general, a "network" comprises one or more end nodes having physical connections to one or more networking devices of the network. However, a "network" can be made up of a collection of peers without any special networking devices. Furthermore, it should be appreciated that physical connections between peers are not always required, such as in, for example, a wireless system. A "networking device" generally comprises hardware and/or software used to transfer information through a network. Examples of a networking device include a multi-port device, a router, a switch, a repeater, or any other device that facilitates the forwarding of information. An "end node" normally comprises a combination of hardware and/or software that constitutes the source or destination of the information. Examples of an end node include devices such as a telephone, fax machine, video source, workstation, computer, printer, server, file server, application server, set-top box and other like devices. "Data traffic" generally comprises one or more signals having one or more bits of data, address, control or any combination thereof transmitted in accordance with any chosen scheme. "Data traffic" can be data, voice, address, and/or control in any representative signaling format or protocol. A "link" is broadly defined as one or more physical or virtual information carrying media that establish a communication pathway such as, for example, optical fiber, electrical wire, cable, bus traces, wireless channels (e.g. radio, satellite frequency, etc.) and the like. As discussed previously, an aggregated link is a bundling of multiple links into a single aggregated logical link with greater aggregate data bandwidth.

Generally, embodiments of the invention can be utilized in a network which is a packetized, packet-switched, connection oriented, etc., network that can utilize IEEE 802.3, Ethernet protocol, Transmission Control Protocol/Internet Protocol (TCP/IP), Asynchronous Transfer Mode (ATM), Frame Relay (FR), Point-to Point Protocol (PPP), Systems Network Architecture (SNA), Voice over Internet Protocol (VoIP), or any other sort of protocol. A network allows the communication of data traffic between any end nodes in the network using packets. Data traffic through the network may be of any type including data, voice, graphics, video, audio, e-mail, Fax, text, multi-media, documents and other generic forms of data. The network is typically a data network that may contain switching and/or routing equipment designed to transfer digital data traffic.

FIG. 1 is a diagram illustrating a system 100 employing multi-device link aggregation (MDLA) according to one embodiment of the invention. As shown in FIG. 1, the system 100 includes a first MDLA device 102 and a second MDLA device 104. In one embodiment, the first and second MDLA devices 102 and 104 can be multi-port devices such as switches or routers. An MDLA internal link 110 connects the first and second MDLA devices 102 and 104. In one embodiment, the MDLA internal link 110 can be an Ethernet link which may or may not also employ IEEE 802.3ad LACP. However, it should be appreciated that the MDLA internal link 110 can be any sort of link, such as an optical link.

Each of the interconnected first and second MDLA devices 102 and 104 is connected to a common link aggregation (LAG) partner device, such as common LAG partner device workstation 114 and common LAG partner device server 115, by an aggregated link. Particularly, FIG. 1 shows aggregated links 118, 120, 121, and 122. Typically, the first and second MDLA devices 102 and 104 exchange protocol data units (PDUs) to detect devices that are common to both the first and second MDLA devices such that the detected devices are designated as a common LAG partner devices (e.g. common LAG partner device workstation 114 and common LAG partner device server 115). By the present system 100, if one of the MDLA devices 102 or 104 were to fail, data traffic of the associated aggregated link to the failed MDLA device can be automatically forwarded by the other non-failed MDLA device. Accordingly, the reliability of the system is increased due to the fact that even if an entire MDLA device were to fail completely, the aggregated link and its associated data can still be forwarded through the network. Moreover, after the failed MDLA device is repaired, the system 100 restores itself to the same configuration as prior to the failure of the MDLA device.

As will be described in more detail later, common LAG partner device workstation 114 aggregates its links towards common LAG partner device server 115 and common LAG partner device server 115 aggregates its links towards common LAG partner device workstation 114. Both, common LAG partner device workstation 114 and server 115 "think" they are communicating over a single aggregation group to a single entity, while, in fact, they are actually communicating with a pair of MDLA devices 102 and 104. The MDLA devices 102 and 104, which utilize an MDLA protocol that will be discussed in more detail later, fool the common LAG partner device workstation 114 and server 115 into the belief that they are merely communicating with one device, thereby achieving both additional bandwidth and redundancy. It should be appreciated that common LAG partner device workstation 114 and server 115 can be any sort of device, such as a switch.

Some prior systems provide redundancy by providing two or more of everything within a single device. This is complicated and expensive. It also imposes a cost burden on those configurations in which redundancy is not required. The present invention allows a product line to offer a redundancy option with virtually zero-burden on those configurations that do not need it.

In a particular embodiment of the invention, the common LAG partner device workstation 114 and server 115 support Institute of Electrical and Electronic Engineers ("IEEE") 802.3ad Link Aggregation Control Protocol (LACP) to transparently connect aggregated links 118, 120, 121, and 122 to the two MDLA devices 102 and 104, which also support IEEE 802.3ad LACP. As will be discussed, the common LAG partner device workstation 114 and server 115 aggregate their links transparently to the two MDLA devices 102 and 104 as if they were merely connecting to a single device. Typically, the MDLA device can be considered a type of switch or router. It should be appreciated that IEEE 802.03ad LACP is a control protocol which, when superimposed on devices employing one or more of the IEEE 802.3 protocols, Ethernet protocols, Fiber Distributed Data Interface (FDDI) protocols, etc., allow links to be aggregated.

As described previously, the IEEE 802.3ad LACP standard specifies a method to aggregate two or more parallel links between two devices (e.g. switches) in order to achieve higher aggregated bandwidth and increased reliability for the aggregated link, however, it cannot address the situation where a forwarding device (e.g. a switch) completely fails. The IEEE 802.3ad standard defines a Link Aggregation Control Protocol (LACP) to verify link aggregation configurations and to distribute packets across the set of links within the aggregated logical link. The standard also provides mechanisms for adding and subtracting links from the aggregated logical link. In particular, the IEEE 802.3ad standard for Link Aggregation defines an optional Link Aggregation sublayer for use with CSMA/CD MACs that allows one or more links to be aggregated together to form a Link Aggregation Group, such that a MAC client can treat the Link Aggregation Group as if it were a single link. Moreover, the IEEE 802.3ad specification for Link Aggregation Control Protocol (LACP) further defines how connections can be combined to load share, load balance, and provide better resiliency for high-bandwidth network connections. The IEEE 802.3ad link aggregation standard provides inherent and automatic redundancy. In other words, should one of the multiple ports used in a link fail, network traffic is dynamically redirected to flow across the remaining good physical links in the aggregated logical link.

It should be appreciated by those skilled in the art that although embodiments of the present invention will be described with reference to a LAN environment, embodiments of the invention are equally applicable to other network environments such as WANs, the Internet, and other private and public networks, and combinations thereof.

In this IEEE 802.3ad LACP embodiment, the first and second MDLA devices 102 and 104 exchange link aggregation control protocol units (LACPDUs) (in compliance with IEEE 802.3ad LACP) through the MDLA internal link 110 to detect devices that are connected to both the first and second MDLA devices 102 and 104 such that the detected devices are designated as common LAG partner devices (e.g. workstation 114 and server 115). The first and second MDLA devices 102 and 104 determine a common key for both the first and second MDLA devices 102 and 104 such that the common LAG partner devices transparently aggregate links to both the first and second MDLA devices as if both the devices were single unitary device 130.

Figure 2:
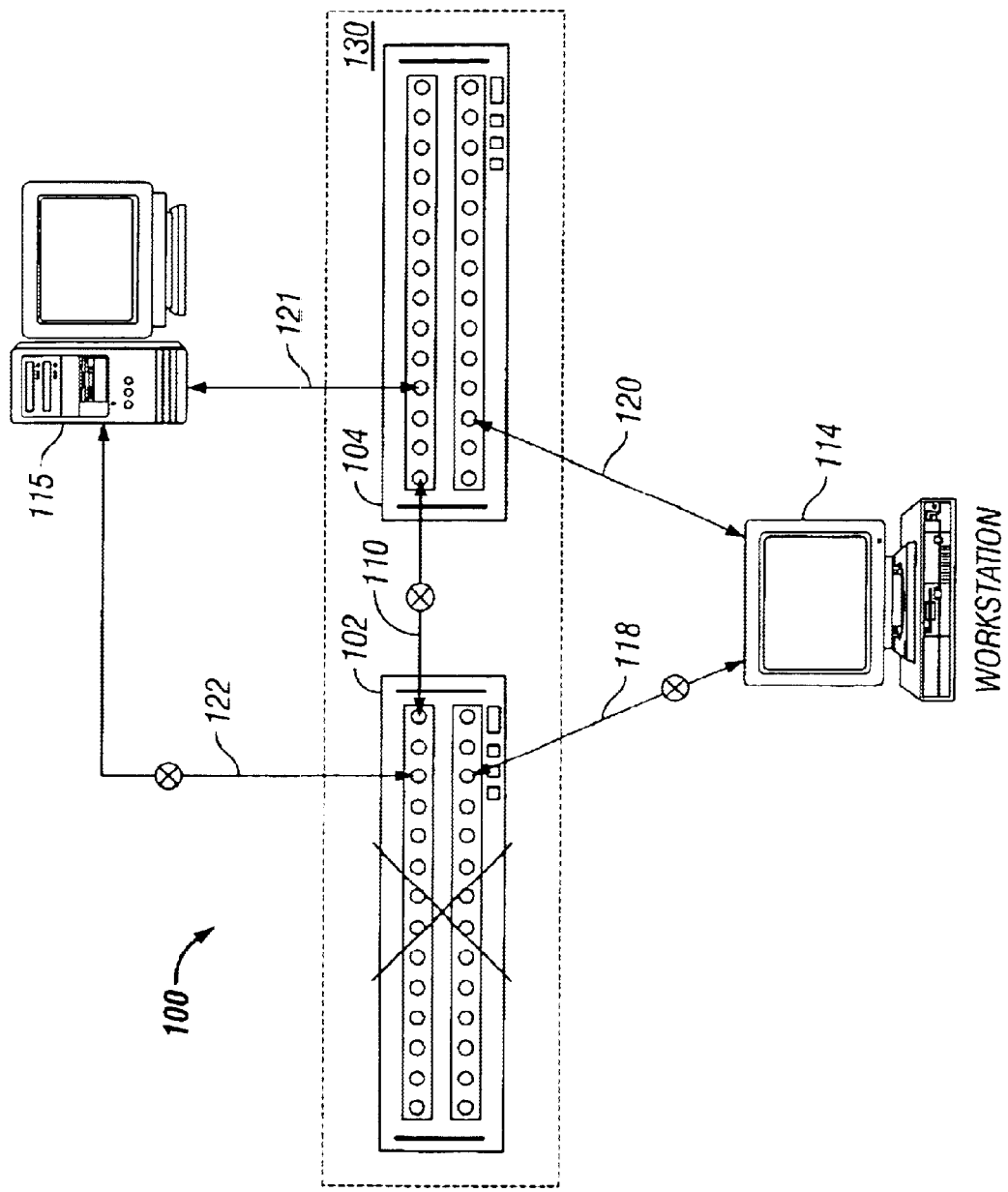
FIG. 2 is a diagram illustrating the system employing multi-device link aggregation (MDLA) of FIG. 1 in which an MDLA device or any of the links into or out of it fails according to one embodiment of the invention.

Turning to FIG. 2, FIG. 2 shows MDLA device 102 failing and as a result aggregated links 118 and 122, and MDLA internal link 110, also fail. Fortunately, even though the first MDLA device 102 has failed, the data traffic over aggregated links 118 and 122 from workstation 114 to server 115 (and from server 115 to workstation 114) can instead be forwarded by the second MDLA device 104 via aggregated links 120 and 121. Thus, the system 100 by providing two interconnected MDLA devices provides increased bandwidth and increased availability of the entire system 100, and the overall network, because MDLA covers the case where if one of the MDLA devices fails then the associated aggregated data traffic is automatically forwarded by the other MDLA device. Therefore, there is an increased likelihood of connectivity between the workstation 114 and server 115. This is a dramatic improvement over standard link aggregation via IEEE 802.3ad which only increases link capacity and only covers the case of a failing link.

Moreover, after the failed MDLA device is repaired, the system 100 is restored to the same configuration as prior to the failure of the MDLA device. As will be discussed in more detail later, the system 100 is self-configuring, such that the MDLA devices 102 and 104 utilizing an MDLA protocol along with LACP, determine and assess their environment (e.g. determining common LAG partner devices) to establish the best configuration for forwarding information. Whenever all the intended links are working, the system 100 uses them to share the load, providing increased forwarding bandwidth. Whenever a link or MDLA device fails, the system 100 falls back to maintaining connectivity, only to switch back to high bandwidth again once the failure is corrected.

Figure 3:
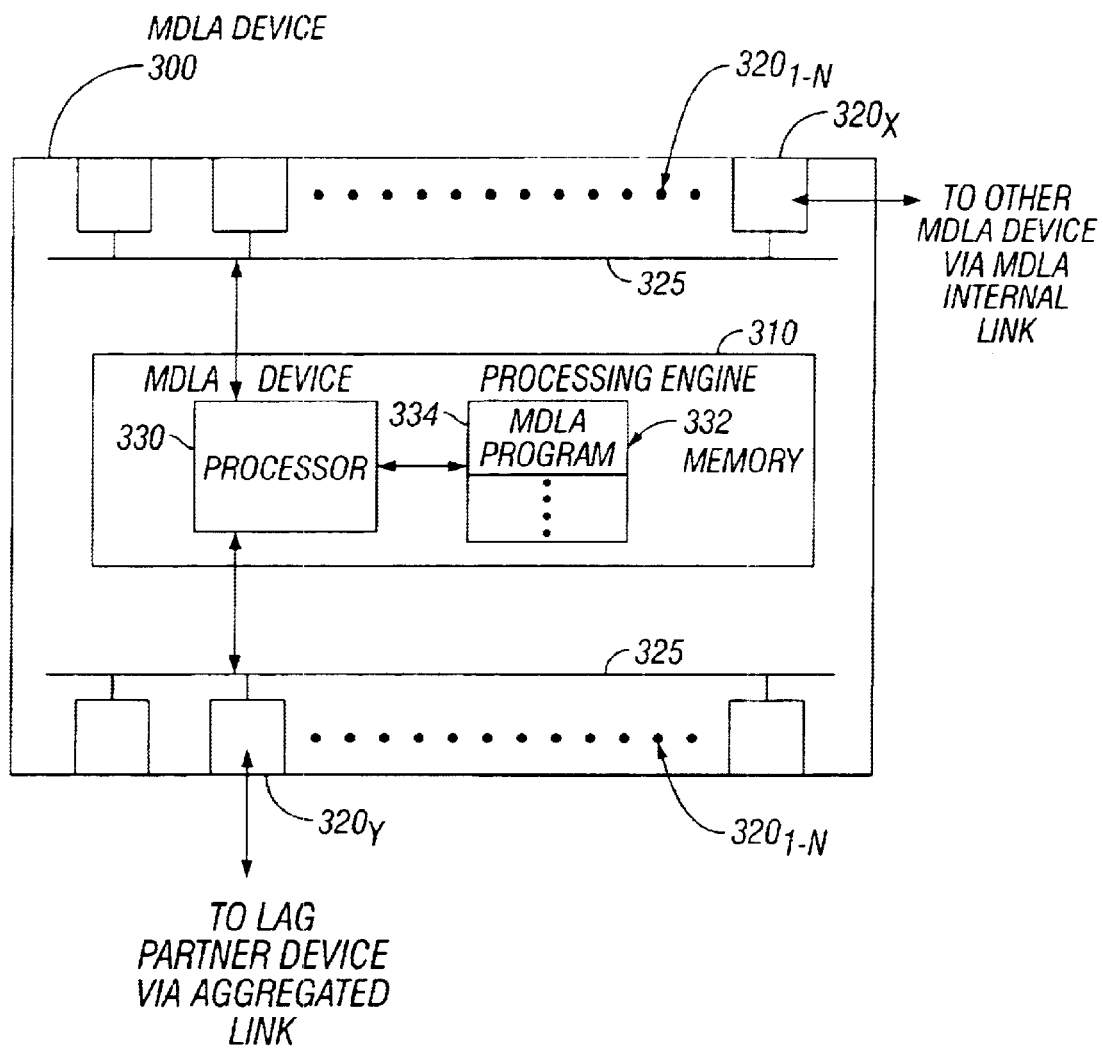
FIG. 3 is a diagram illustrating an example of an MDLA device according to one embodiment of the invention.

Referring briefly to FIG. 3, FIG. 3 is a diagram illustrating an example of an MDLA device 300 according to one embodiment of the invention. In one embodiment, the MDLA device 300 is similar to a typical switch or router capable of supporting IEEE 802.03ad Link Aggregation Control Protocol (LACP), but further, is capable of supporting multi-device link aggregation (MDLA) between two MDLA devices and allows a link aggregation (LAG) partner device to transparently aggregate links to both the first and second MDLA devices as if both the devices were a single unitary device, as will be discussed in more detail later.

The MDLA device 300 preferably includes an MDLA device processing engine 310 and a plurality of ports $320_{1-N}$. The ports $320_{1-N}$ are connected to the MDLA device processing engine 310 via a bus or backplane 325. In particular, one of the ports (e.g. port $320_x$) is connected to another MDLA device via the MDLA internal link and another one of the ports (e.g. port $320_y$) is connected to a LAG partner device via an aggregated link, as previously discussed. This does not imply that general traffic travels on the same bus or through the MDLA processing engine. It merely means that the MDLA processing engine has access to the LACPDUs and can exercise control over the ports.

The device processing engine 310 generally includes a suitable processor 330 and memory 332 (e.g. a machine readable medium) to implement and store, respectively, an MDLA program 334 to execute the functions associated with multi-device link aggregation (MDLA), as well as to perform the other functionality associated with a multi-port device, switch, router, etc. Embodiments of the MDLA device 300, the MDLA processing engine 310, and MDLA program 334 can be implemented in hardware, software, firmware, middleware or a combination thereof. In one embodiment, the MDLA program 334 can be generally implemented by the MDLA device 300 as one or more instructions to perform the desired functions.

In the embodiment shown in FIG. 3, the MDLA program 334 can be generally implemented in a MDLA device 300 having a processing engine 310 that includes a processor 330. The processor 330 processes information in order to implement the functions of the MDLA device 300. As illustrative examples, the "processor" may include a digital signal processor, a microcontroller, a state machine, or even a central processing unit having any type of architecture, such as complex instruction set computers (CISC), reduced instruction set computers (RISC), very long instruction word (VLIW), or hybrid architecture. As shown, the processor 330 is coupled to memory 332. The memory 332 may be part of the overall MDLA device 300 or may be specific for the processing engine 310. The memory 332 can be non-volatile or volatile memory, or any other type of memory, or any combination thereof. Examples of non-volatile memory include a hard disk, flash memory, battery-backed random access memory, Read-only-Memory (ROM) and the like whereas volatile memory includes random access memory (RAM), dynamic random access memory (DRAM) or static random access memory (SRAM), and the like.

When implemented in software (e.g. as an MDLA program 334), the elements of the present invention are the instructions/code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g. a processor, a computer, etc.). Examples of the machine/processor-readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via networks such as the Internet, Intranet, etc.

Those skilled in the art will recognize that the exemplary MDLA device of FIG. 3 is not intended to limit the present invention. Indeed, those skilled in the art will recognize that other alternative MDLA devices may be used without departing from the scope of the present invention. Furthermore, while aspects of the invention and various functional components have been and will be described in particular embodiments, it should be appreciated these aspects and functionalities can be implemented in hardware, software, firmware, middleware or a combination thereof.

Figure 4:
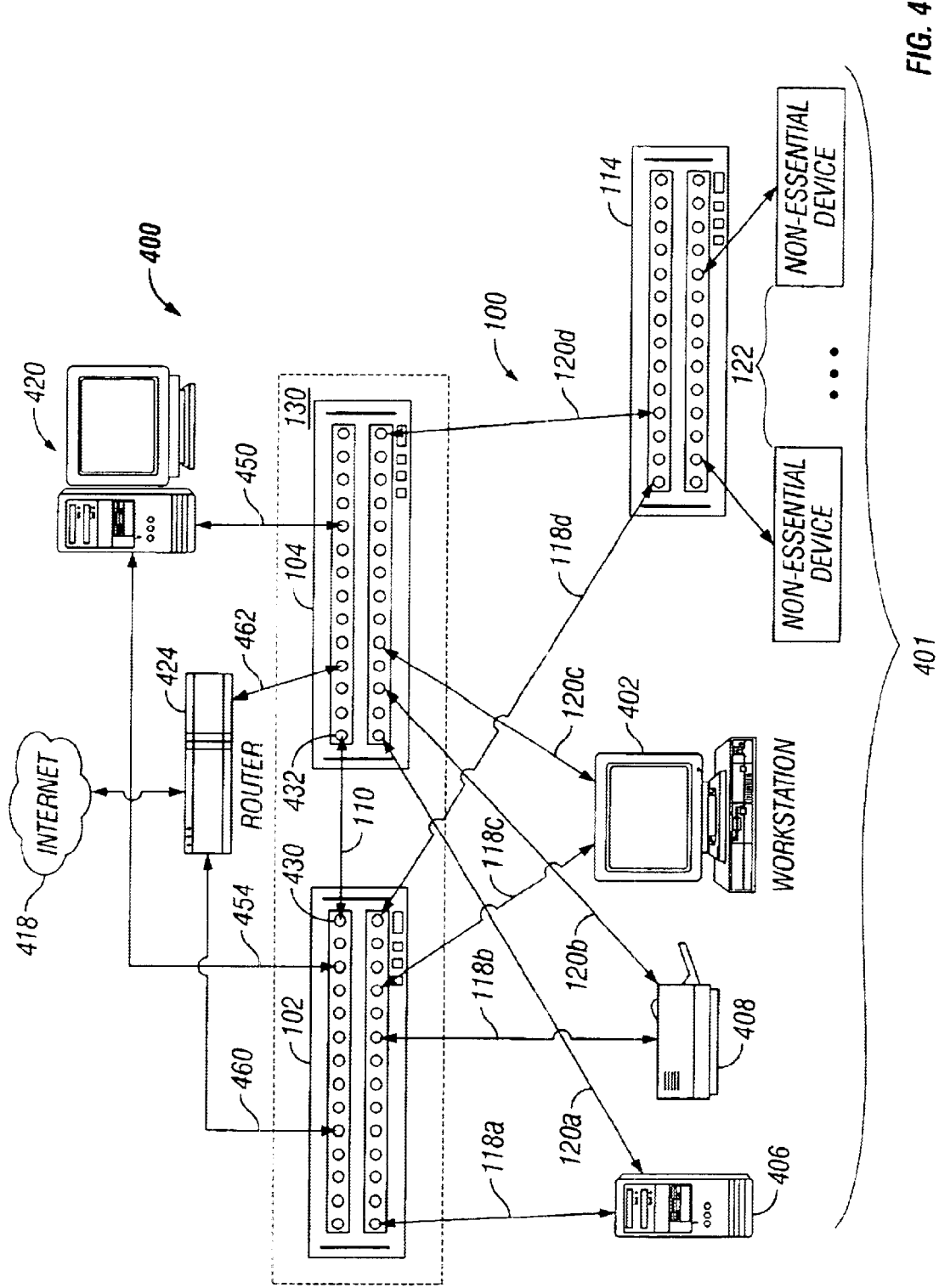
FIG. 4 is a more detailed diagram of FIG. 1 including a plurality of other devices according to one embodiment of the invention.

Turning to FIG. 4, which is a more detailed illustration of FIG. 1 including a plurality of other devices, according to one embodiment of the present invention, the multi-device link aggregation (MDLA) method enables common link aggregation (LAG) partner devices 401 supporting traditional IEEE 802.3ad link aggregation control protocol (LACP) to transparently aggregate links to two MDLA devices 102 and 104 operating MDLA (e.g. the MDLA device 300 running the MDLA program 334 shown in FIG. 3) as if both the devices were single unitary device 130. FIG. 4 additionally shows the system 100 employing multi-device link aggregation (MDLA) as part of a larger network 400.

In this exemplary network 400, LAG partner devices 401: server 406, printer 408, and computer 402 can be and can be directly connected via aggregated links 118a,b,c and 120a, b,c, respectively, to the ports of the first and second MDLA devices 102 and 104, respectively. Also, a LAG partner device 401, e.g. a switch 114, can connect non-essential devices 122 to the ports of the first and second MDLA devices 102 and 104 via aggregated links 118d and 120d, respectively. Non-essential devices 122 are devices that due to their relatively low priority do not require direct aggregated links to the first and second MDLA devices 102 and 104. Furthermore, the first and second MDLA devices 102 and 104 can be connected via their respective ports to a router 424, which, for example, forwards data traffic through the AT&T network to the Internet 418. However, it should be appreciated that more than one router could be used. Also, the first MDLA device 102 also connects via its ports to server computer 420. Additionally, the second MDLA device 104 also connects via its ports to the server computer 420. Thus, the LAG partner devices 401 aggregate data using traditional IEEE 802.3ad link aggregation control protocol (LACP) into aggregated links 118a–d and 120a–d, respectively, which are forwarded to the first and second MDLA devices 102 and 104. In turn, first and second MDLA devices 102 and 104 further forward these aggregated links to router 424 for forwarding to the Internet, as well as, to server computer 420. Moreover, it should be appreciated that the number of links to the first and second MDLA devices 102 and 104 need not be equal to one another.

It should be appreciated that a common LAG partner device can be any sort of device (e.g. personal computer, server computer, workstation etc.) capable of aggregating its links in accordance with IEEE 802.3ad link aggregation control protocol (LACP). Moreover, it should be appreciated that this is only an example of a network and is merely for illustrative purposes.

Methods for multi-device link aggregation (MDLA) are premised upon procedures and protocols for detecting, setting up, and controlling the aggregation of links across multiple MDLA devices (e.g. first MDLA device 102 and second MDLA device 104 connected via MDLA internal link 110). The MDLA protocol is an extension to the IEEE 802.03ad link aggregation control protocol (LACP) and can be implemented by, for example, the exemplary MDLA device 300 running the MDLA program 334 (FIG. 3), as previously discussed. This extension enables MDLA devices operating MDLA to detect which ports are directly attached to another device supporting MDLA and which ports are directly connected to a common LAG partner device also supporting LACP. Moreover, as will be discussed, the first and second MDLA devices 102 and 104 determine a common key for both the first and second MDLA devices 102 and 104 such that the common LAG partner device 114 transparently aggregates links to both the first and second MDLA devices as if both the devices were single unitary device 130.

As shown in FIG. 4, first and second MDLA devices 102 and 104 detect that they are connected to one another on ports 430 and 432, respectively, via MDLA internal link 110. Furthermore, first MDLA device 102 detects that it is connected to common LAG partner devices 401 via its ports and second MDLA device 104 detects that is connected to common LAG partner devices 401 via its ports.

The MDLA protocol facilitates MDLA devices (e.g. the first and second MDLA devices 102 and 104) to agree on a common system ID, keys to use, and which port numbers are to be used by each MDLA device. For example, the first and second MDLA devices 102 and 104 exchange system IDs (via internal MDLA link 110) using the same method as described by the IEEE 802.03ad LACP standard. Based upon the system IDs, one of the first or second MDLA devices 102 or 104 is designated as the master device and the other is designated as the slave device. In one embodiment, the MDLA device with the lowest system ID is designated as the master MDLA device and the MDLA with the highest system ID is designated as the slave MDLA device. For example, the system ID utilized can be the unique MAC address of each MDLA device. However, it should be appreciated, that any number of protocols for determining which MDLA device is to be the master MDLA device can be used.

MDLA procedures and protocols handle link aggregation control protocol data units (LACPDUs) (in compliance with IEEE 802.3ad LACP) as follows. The first and second MDLA devices 102 and 104 exchange LACPDUs received from devices on their non-MDLA ports (i.e. ports that are connected to common LAG partner devices 401) through their MDLA ports 430 and 432, via MDLA internal link 110, to thereby detect devices that are common to both the first and second MDLA devices 102 and 104. In this way, the detected devices are designated as common LAG partner devices (e.g. common LAG partner devices 401). This allows interconnected MDLA devices to determine whether a LAG partner device is also connected to an adjacent MDLA device and thus, whether the LAG partner device should be tricked to enable aggregation of its links towards the two MDLA devices as if they were a single unitary device. Thus, the common LAG partner devices 401 are tricked into "thinking" they are aggregating their aggregated links between themselves and another single IEEE 802.3ad compliant device.

In order to accomplish this handling of LACPDUs, for non-MDLA ports (i.e. ports that are connected to common LAG partner devices 401), normal IEEE 802.3ad LACP is running. The LACPDUs received on the non-MDLA ports are transparently forwarded to MDLA ports 430 and 432 such that they can be transported across internal MDLA link 110 and can be shared by the MDLA devices 102 and 104. However, LACPDUs received on an MDLA port 430 or 432 that has the same system ID as the receiving MDLA device is discarded to prevent redundant LACPDUs from circulating through the system 100. On the other hand, LACPDUs received on an MDLA port 430 or 432 with a different system ID (such that they are being properly transferred across MDLA devices) are sent to an LACP protocol handler for the MDLA internal link 110.

The MDLA internal link is used to detect adjacent MDLA devices (e.g. MDLA device 102 and 104) and to exchange necessary LACPDU information to enable aggregation of links towards common LAG partners utilizing IEEE 802.3ad LACP. The MDLA internal link can consist of a single physical link, but may consist of two or more physical links aggregated using LACP for greater robustness. On the MDLA internal link 110, multiple instances of IEEE 802.3ad LACP are running. Particularly, a primary LACP instance is executed between the two MDLA devices 102 and 104 to assure that the devices are properly interconnected and to detect and verify aggregated links between the devices. Also, as previously discussed, each MDLA device 102 and 104 receives LACPDUs from the common LAG partner devices connected to the associated MDLA device. The MDLA devices 102 and 104 exchange and record information about which LAG partner devices are available using the MDLA internal link 110. These LACPDUs are used to detect partners that are common to both MDLA devices and as such can be aggregated. As in the current example, MDLA devices 102 and 104 can detect common LAG partner devices 401. No LACPDUs to LACP partner devices are generated on the MDLA ports 430 and 432. If a link fails on a port where one or more LACP partners are recorded, the adjacent MDLA device is advised about this fact.

Furthermore, the first and second MDLA devices 102 and 104 determine a common key for both the first and second MDLA devices 102 and 104. The key acts as a shared map between the participating MDLA devices of what working aggregated links (e.g. aggregated links 118a–d and 120a–d) are connected between identified ports of the common LAG partner devices 401 and identified ports of the MDLA devices, such that the MDLA devices can operate as if it were one single device in conjunction with the LAG partner. For example, MAC addresses can be used as port identifiers. However, the two interconnected MDLA devices cannot use the same port number (i.e. port identifier) in information sent to their common LAG partners such that in one embodiment, the master MDLA device instructs the connected slave MDLA device about what port numbers/identifiers to use. Thus, as shown in the current example, by utilizing a common key, the common LAG partner devices 401 can transparently aggregate their links to both the first and second MDLA devices 102 and 104 as if both the devices were a single unitary IEEE 802.3ad LACP compliant device 130 and the first and second MDLA devices 102 and 104 can exchange data, as previously discussed, such that they operate as a single unitary IEEE 802.3ad LACP compliant device 130.

MDLA procedures and protocol used standard frame forwarding rules with the following exception: for common LAG partner devices detected over both an MDLA internal link and a direct LACP route, the direct LACP route takes precedence-that is, no data to a LAG partner device forwarded by both a non-MDLA port and MDLA ports is sent using the MDLA ports. As an example, a LAG partner device 401 aggregates data using traditional IEEE 802.3ad link aggregation control protocol (LACP) into aggregated links 118a–d and 120a–d, respectively, which are forwarded to the first and second MDLA devices 102 and 104. In turn, first and second MDLA devices 102 and 104 further forward these aggregated links to router 424 for forwarding to the Internet, as well as, to server computer 420. In this example, due to the use of MDLA protocol and the MDLA devices 102 and 104, the LAG partner devices 401 believe that they are connected to one single unitary LACP device 130 and transparently aggregates their aggregated links 118*a–d* and 120*a–d* to the two MDLA devices and are tricked into believing that there is only one single unitary LACP device 130. For traffic from server 420 to common LAG partner devices 401 detected over both the MDLA internal link 110 and a direct LACP route (e.g. aggregated link 450 and aggregated link 120*d* directly to LAG partner switch 114), the direct LACP route takes precedence-that is, no data to a client routable by both a non-MDLA port (e.g. the port connected to LAG partner switch 114 via aggregated link 120*d*) and MDLA ports 430 and 432 is sent using the MDLA ports.

As previously discussed, common LAG partner devices 401 are unaware that there are two separate MDLA devices 102 and 104. When common LAG partner devices 401 send data to server 420 via aggregated links 118*a–d*, respectively, MDLA device 102 communicates with server 420 through link 454.

Figure 5:
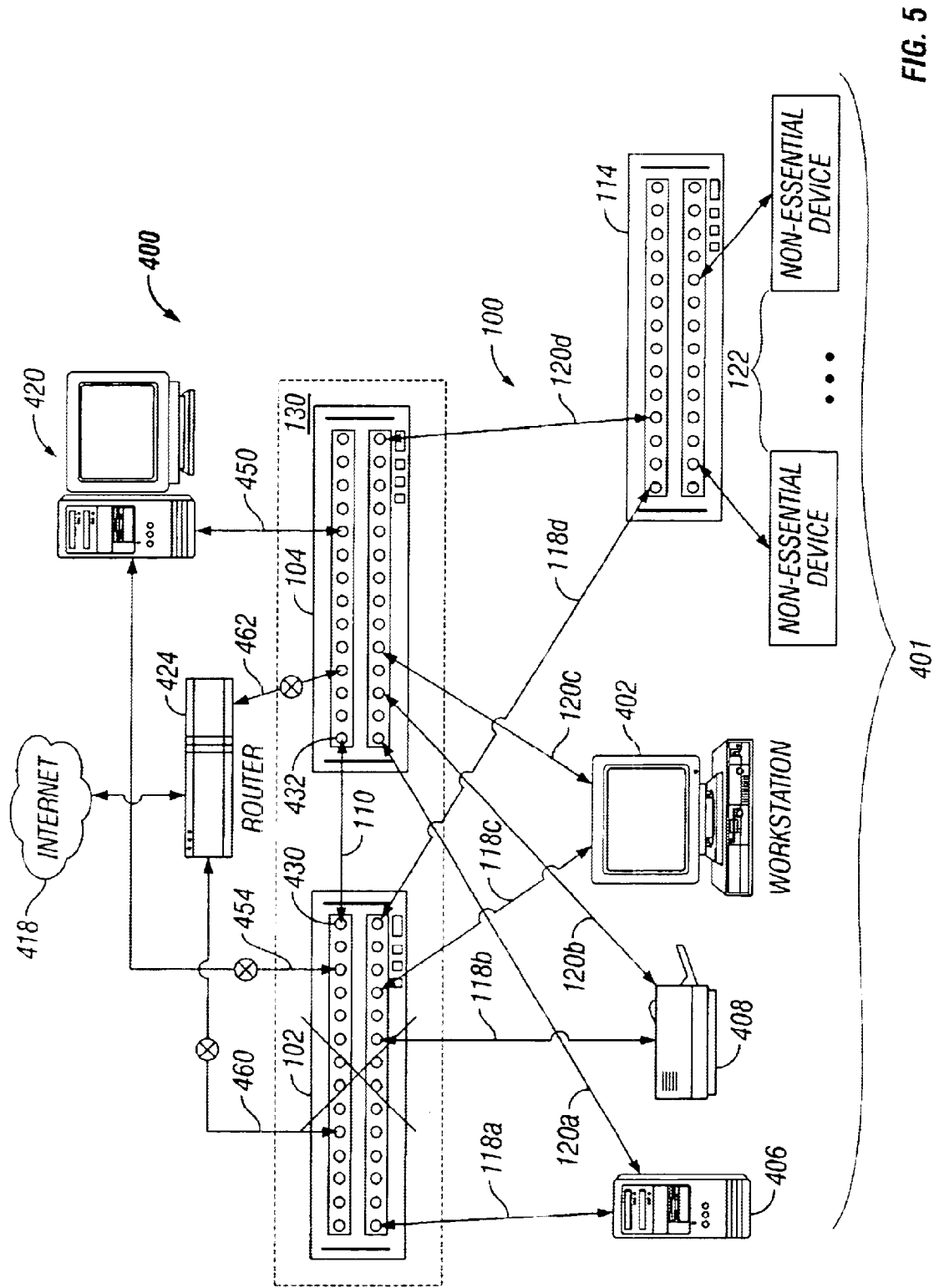
FIG. 5 shows the diagram of FIG. 4 illustrating one or more link failures according to one embodiment of the invention.

However, turning to FIG. 5, if link 454 were to fail, data from aggregated links 118*a–d* would be sent from MDLA device 102 through internal MDLA link 110 to MDLA device 104 and through link 450 to server 420. Moreover, if link 460 were to fail data sent from common LAG partner devices 401 to the Internet 418 could be sent through aggregated links 120*a–d* to MDLA device 104 and through link 462 to router 424 and onto the Internet 418. On the other hand, if link 462 were to fail data sent from common LAG partner devices 401 to the Internet could be sent through aggregated links 118*a–d* to MDLA device 102 and through link 460 to router 424 and onto the Internet 418. Thus, the combination of the unique MDLA devices 102 and 104 along with the unique MDLA protocol, substantially increases the reliability of connections of aggregated links from LAG partner devices 401 to the rest of the network 400.

Figure 6:
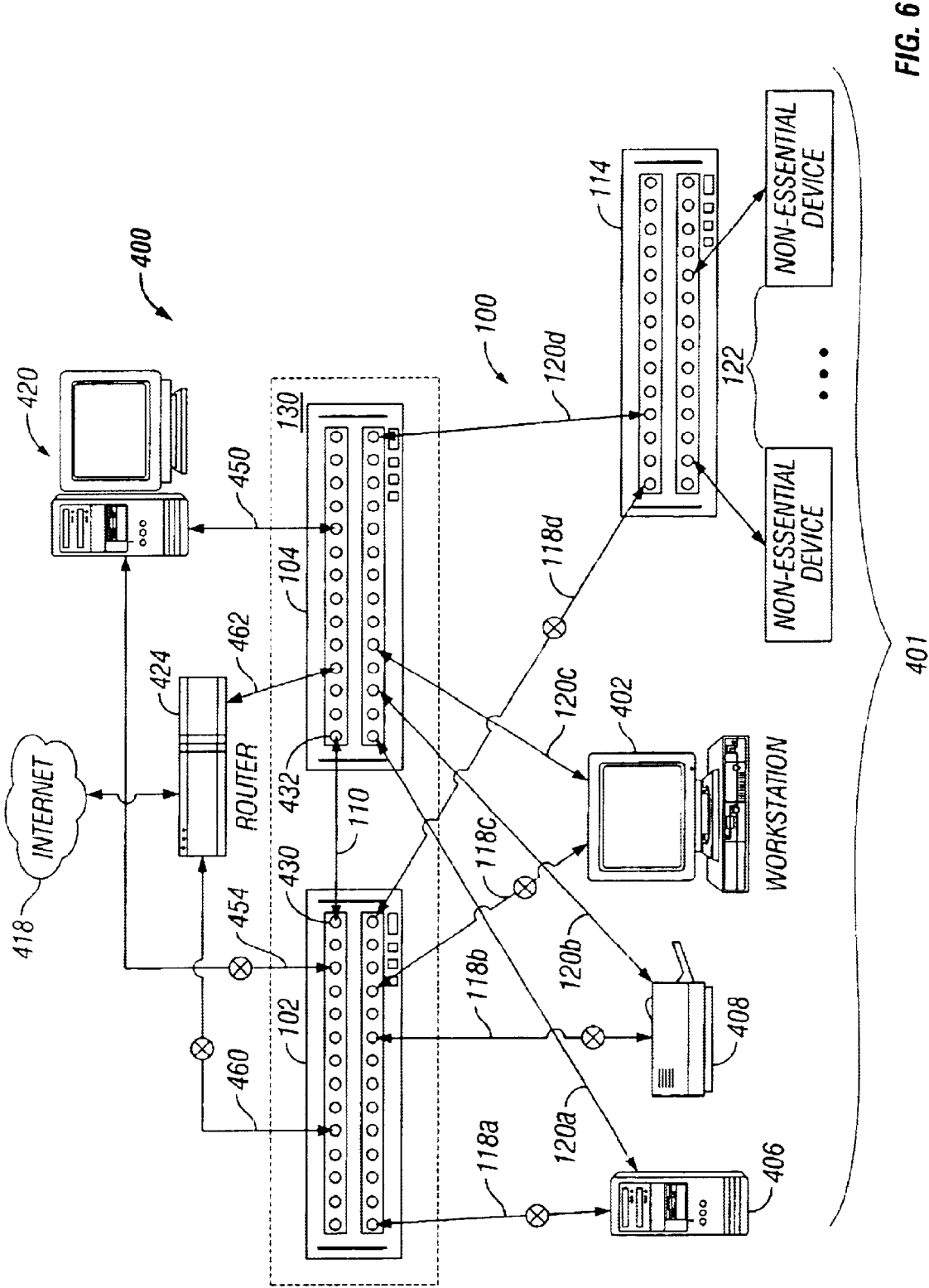
FIG. 6 shows the diagram of FIG. 4 illustrating the failure of an MDLA device according to one embodiment of the invention.

Furthermore, turning to FIG. 6, if one of the MDLA devices failed, for example, MDLA device 102, the result would be that aggregated links 118*a–d* and MDLA internal link 110 would also fail. Advantageously, even though the first MDLA device 102 has failed, data traffic of the associated aggregated links 118*a–d* can instead be automatically forwarded by the second MDLA device 104 using another aggregated link, or one of the existing aggregated links 120*a–d*. Thus, the system 100 by providing two interconnected MDLA devices provides increased bandwidth and increased availability of the entire system 100, and the network 400, because MDLA covers the case where if one of the MDLA devices fails then the associated aggregated data traffic is automatically forwarded by the other MDLA device. Therefore, there is an increased chance of connectivity between the LAG partner devices 401 and the rest of the network. This is a dramatic improvement over standard link aggregation via IEEE 802.03ad which only increases link capacity and only covers the case of a failing link. Further, it should be appreciated that any number of MDLA devices can be interconnected to provide increased reliability.

Moreover, multi-device link aggregation (MDLA) according to embodiments of the invention, can be deployed in many situations and is equally applicable for both interconnected devices using standard network links (e.g. Ethernet) and for more specific interconnections, such as stacker-link for interconnecting devices in a stack. MDLA be implemented in general-purpose multi-port devices, as previously discussed, and also where a client (e.g. a personal computer, workstation, server computer, etc.) is able to aggregate its own links to two separate MDLA devices through standard IEEE 802.3ad LACP. MDLA may also be supported in dedicated products to provide high availability solutions. These are used to scale performance and reliability for a set of attached devices.

Figure 7:
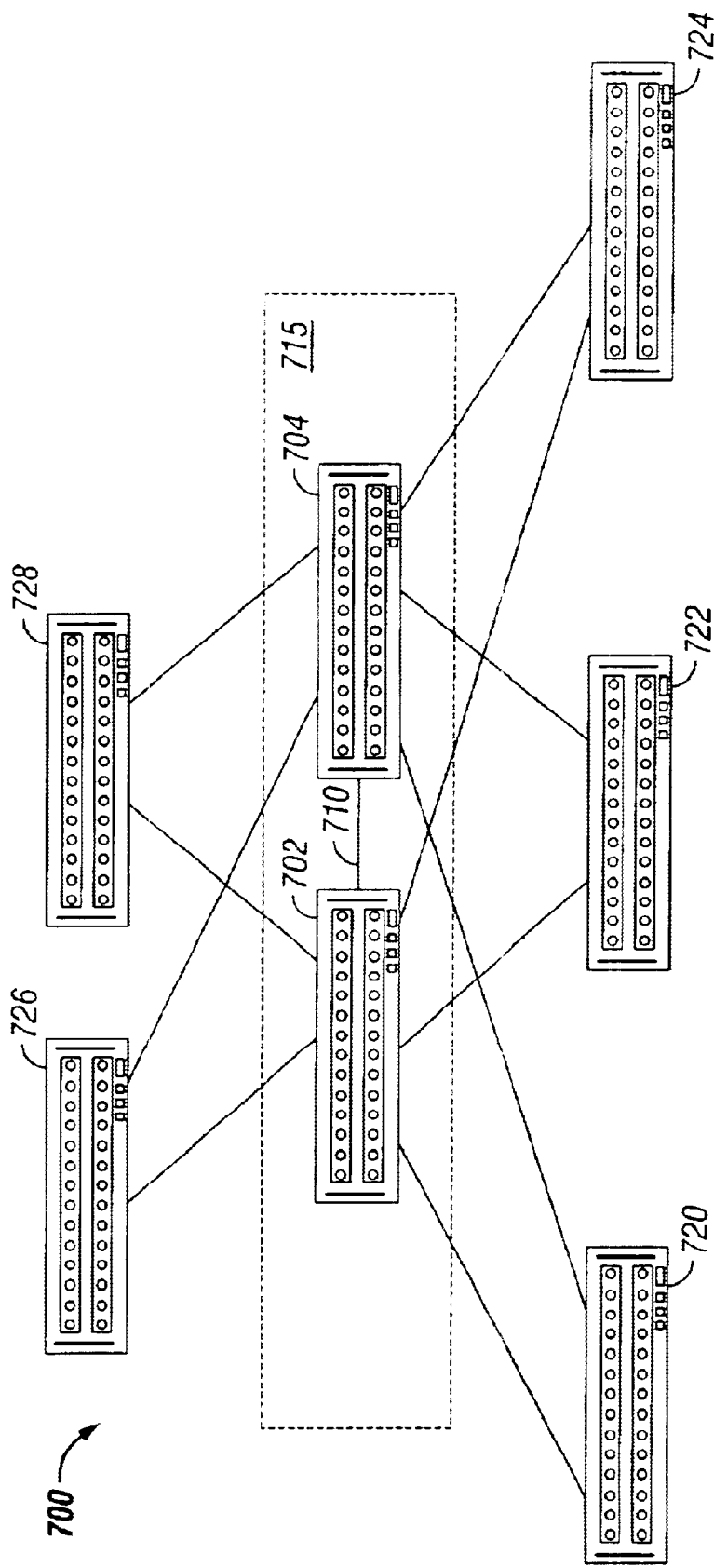
FIG. 7 is a diagram illustrating another system employing multi-device link aggregation (MDLA) including a number of interconnected multi-port devices according to one embodiment of the invention.

FIG. 7 is a diagram illustrating another system 700 employing multi-device link aggregation (MDLA) including a number of interconnected multi-port devices according to one embodiment of the invention. As shown in FIG. 7, a pair of MDLA devices 702 and 704, interconnected by MDLA internal link 710, form a single unitary device 715 that enable a plurality of common link aggregation partners 720, 722, 724, 726, and 728 (e.g. multi-port devices) to transparently aggregate links to the two MDLA devices 702 and 704, which operate using MDLA, as if both the devices were single unitary device 715. The method and operations of MDLA have been discussed previously, in detail, and for brevity's sake will not be repeated.

By the present system 700, if one of the MDLA devices 702 or 704 were to fail, data traffic of the associated aggregated link to the failed MDLA device can be automatically forwarded by the other non-failed MDLA device. Accordingly, the reliability of the system 700 is dramatically increased due to the fact that even if a MDLA device were to completely fail, the aggregated link and its associated data can still be forwarded through the other MDLA device.

Figure 8:
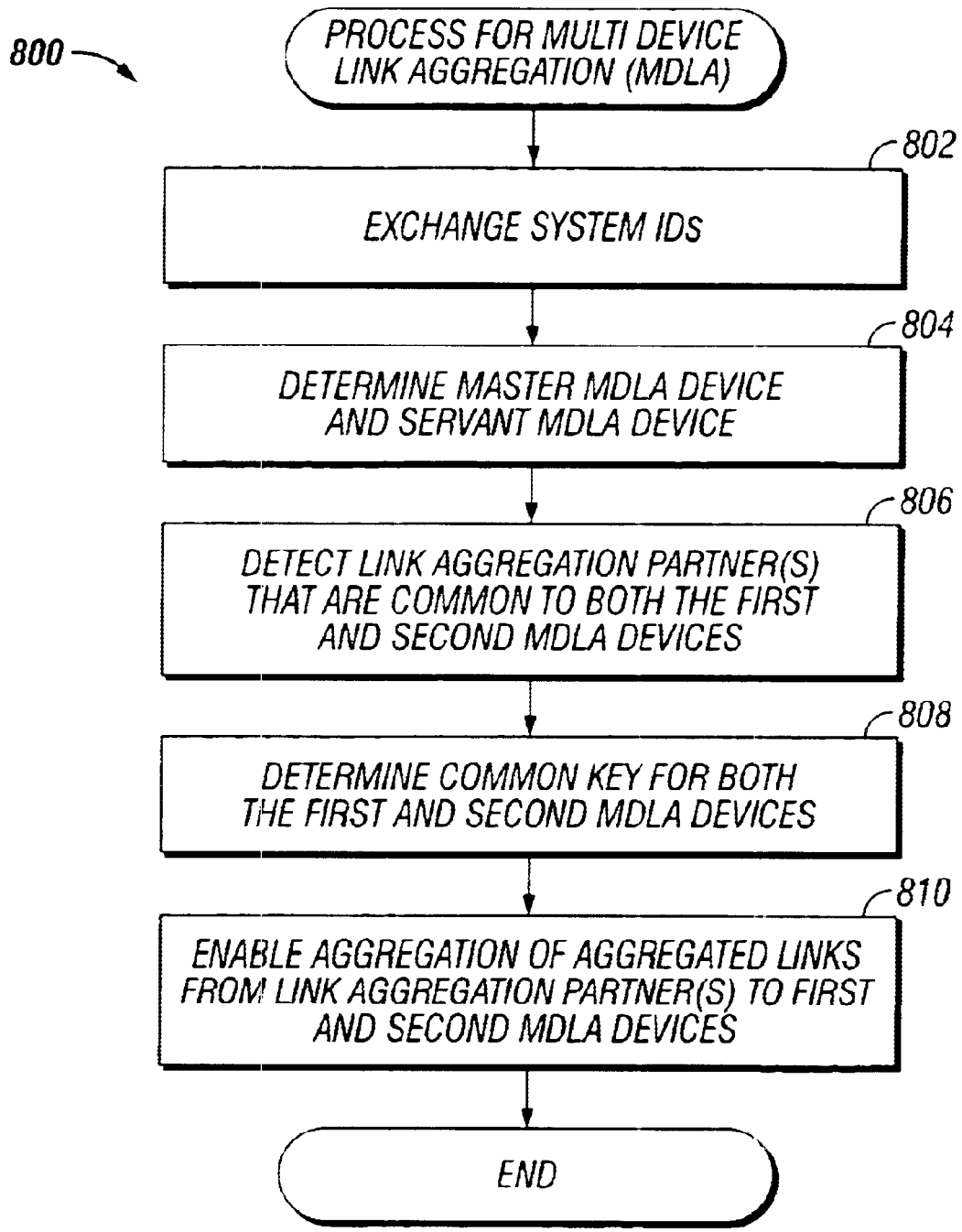
FIG. 8 is a flow diagram illustrating a process for multi-device link aggregation (MDLA) according to one embodiment of the invention.

FIG. 8 is a flow diagram illustrating a process 800 for multi-device link aggregation (MDLA) according to one embodiment of the invention. The process 800 broadly allows for multi-device link aggregation (MDLA) between two network devices. The process 800 includes exchanging system IDs between two network devices (block 802). Next, a master MDLA device and a servant MDLA device are determined (block 804). The process 800 then detects link aggregation partners that are common to both the first and second MDLA devices (block 806). The process 800 further determines a common key for both the first and second MDLA devices (block 808). The process 800 then enables aggregation of aggregated links from link aggregation partners to the first and second MDLA devices (block 810).

While the present invention and its various functional components have been described in particular embodiments, it should be appreciated the present invention can be implemented in hardware, software, firmware, middleware or a combination thereof and utilized in systems, subsystems, components, or sub-components thereof. When implemented in software, the elements of the present invention are the instructions/code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g. a processor, a computer, etc.). Examples of the machine/processor-readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via networks such as the Internet, Intranet, etc.

Thus, embodiments of the present invention may be implemented as a method, system, device, or machine-readable medium (e.g. a processor readable medium or a computer readable medium) using standard programming and/or engineering techniques to produce software, firmware, hardware, middleware, or any combination thereof. The term "machine readable medium" (or alternatively, "processor readable medium" or "computer readable medium") as used herein is intended to encompass a medium accessible from any machine/process/computer for reading and execution. Of course, those skilled in the art will recognize that many modifications may be made to this configuration without departing from the scope of the present invention.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system comprising:
    a first multi-device link aggregation (MDLA) device;
    a second MDLA device; and
    an MDLA internal link connecting the first MDLA device to the second MDLA device;
    wherein each of the interconnected first and second MDLA devices is connected to a common link aggregation (LAG) partner device by an aggregated link, respectively and wherein, if one of the first or second MDLA devices fails, data traffic of the associated aggregated link to the failed MDLA device is forwarded by the other non-failed MDLA device.

2. The system of claim 1, wherein, after the failed MDLA device is repaired, the system is restored to the same configuration as prior to the failure of the MDLA device.

3. The system of claim 1, wherein, the first and second MDLA devices exchange protocol data units (PDUs) through the MDLA internal link to detect devices that are common to both the first and second MDLA devices such that the detected devices are designated as common LAG partner devices.

4. The system of claim 1, wherein, the common LAG partner device supports Institute of Electrical and Electronic Engineers (IEEE) 802.03ad link aggregation control protocol (LACP) to provide an aggregated link to each of the first and second MDLA devices, respectively.

5. The system of claim 4, wherein, each of the first and second MDLA devices supports IEEE 802.03ad LACP.

6. The system of claim 5, wherein, the first and second MDLA devices exchange link aggregation control protocol data units (LACPDUs) that are in accordance with IEEE 802.03ad LACP through the MDLA internal link to detect devices that are common to both the first and second MDLA devices such that the detected devices are designated as common LAG partner devices.

7. The system of claim 1, wherein, the first and second MDLA devices exchange system IDs, and based upon the system IDs, one of the first or second MDLA devices is designated as a master device and the other of the first or second MDLA devices is designated as a slave device.

8. The system of claim 1, wherein, the first and second MDLA devices determine a common key for both the first and second MDLA devices such that the common LAG partner device aggregates links to both the first and second MDLA devices as if both the first and second MDLA devices were a single unitary device.

9. The system of claim 1, wherein, the MDLA internal link is an Ethernet link.

10. The system of claim 1, wherein, an MDLA device is a switch.

11. A system comprising:
    a first multi-device link aggregation (MDLA) device that supports Institute of Electrical and Electronic Engineers (IEEE) 802.03ad link aggregation control protocol (LACP);
    a second MDLA device that supports IEEE 802.03ad LACP; and
    an MDLA internal link that connects the first MDLA device to the second MDLA device, each of the interconnected first and second MDLA devices are connected by an aggregated link to a common link aggregation (LAG) partner device supporting IEEE 802.03ad LACP, respectively, the first and second MDLA devices to exchange link aggregation control protocol data units (LACPDUs) through the MDLA internal link to detect common LAG partner devices that are common to both the first and second MDLA devices;
    wherein, if one of the first or second MDLA devices fails, data traffic of the associated aggregated link of the failed MDLA device is forwarded by the other non-failed MDLA device.

12. The system of claim 11, wherein, the first and second MDLA devices exchange system IDs, and based upon the system IDs, one of the first or second MDLA devices is designated as a master device and the other of the first or second MDLA devices is designated as a slave device.

13. The system of claim 11, wherein, after the failed MDLA device is repaired, the system is restored to the same configuration as prior to the failure of the MDLA device.

14. The system of claim 11, wherein, the first and second MDLA devices determine a common key for both the first and second MDLA devices such that the common LAG partner device aggregates links to both the first and second MDLA devices as if both the first and second MDLA devices were a single unitary device.

15. A multi-device link aggregation (MDLA) device comprising:
    a port to connect to another MDLA device through an MDLA internal link, wherein each of the interconnected MDLA devices are connectable to a common link aggregation (LAG) partner device by an aggregated link, respectively; and
    an MDLA device processing engine to:
    if the other MDLA device fails, route the data traffic of the aggregated link associated with the other failed MDLA device.

16. The MDLA device of claim 15, wherein, the processing engine controls the exchange of protocol data units (PDUs) through the MDLA internal link to detect devices that are common to both MDLA devices such that the detected devices are designated as common LAG partner devices.

17. The MDLA device of claim 15, wherein, the common LAG partner device supports Institute of Electrical and Electronic Engineers (IEEE) 802.03ad link aggregation control protocol (LACP) to provide an aggregated link to each of the MDLA devices, respectively.

18. The MDLA device of claim 17, wherein, the MDLA devices support IEEE 802.03ad LACP.

19. The MDLA device claim 18, wherein, the processing engine controls the exchange of link aggregation control protocol data units (LACPDUs) that are in accordance with IEEE 802.03ad LACP through the MDLA internal link to detect devices that are common to both MDLA devices such that the detected devices are designated as common LAG partner devices.

20. The MDLA device of claim 15, wherein, the processing engine controls the exchange of system IDs between the MDLA devices, and based upon the system IDs, one of the MDLA devices is designated as a master device and the other MDLA device is designated as a slave device.

21. The MDLA device of claim 15, wherein, the processing engine determines a common key for both the MDLA devices such that a common LAG partner device aggregates links to both the MDLA devices as if the MDLA devices were a single unitary device.

22. A method comprising:
connecting a first multi-device link aggregation (MDLA) device to a second MDLA device, wherein each of the interconnected first and second MDLA devices is connected to a common link aggregation (LAG) partner device by an aggregated link, respectively; and
if one of the first or second MDLA devices fails, routing the data traffic of the aggregated link associated with the failed MDLA device using the non-failed MDLA device.

23. The method of claim 22, further comprising, exchanging protocol data units (PDUs) between the first and second MDLA devices to detect devices that are common to both the first and second MDLA devices such that the detected devices are designated as common LAG partner devices.

24. The method of claim 22, wherein, the common LAG partner device supports Institute of Electrical and Electronic Engineers (IEEE) 802.03ad link aggregation control protocol (LACP) to provide an aggregated link to each of the first and second MDLA devices, respectively.

25. The method of claim 24, wherein, each of the first and second MDLA devices supports IEEE 802.03ad LACP.

26. The method of claim 25, further comprising, exchanging link aggregation control protocol data units (LACPDUs) that are in accordance with IEEE 802.03ad LACP between the first and second MDLA devices to detect devices that are common to both the first and second MDLA devices such that the detected devices are designated as common LAG partner devices.

27. The method of claim 22, further comprising, exchanging system IDs between the first and second MDLA devices, and based upon the system IDs, designating one of the first or second MDLA devices as a master device and the other of the first or second MDLA devices as a slave device.

28. The method of claim 22, further comprising, determining a common key for both the first and second MDLA devices such that the common LAG partner device aggregates links to both the first and second MDLA devices as if both the first and second MDLA devices were a single unitary device.

29. A machine-readable medium having stored thereon instructions, which when executed by a first multi-device link aggregation (MDLA) device, cause the first MDLA device to perform the following:
connecting the first multi-device link aggregation (MDLA) device to a second MDLA device, wherein each of the interconnected first and second MDLA devices is connected to a common link aggregation (LAG) partner device by an aggregated link, respectively; and
if one of the first or second MDLA devices fails, routing the data traffic of the aggregated link associated with the failed MDLA device using the non-failed MDLA device.

30. The machine-readable medium of claim 29, further comprising, exchanging protocol data units (PDUs) between the first and second MDLA devices to detect devices that are common to both the first and second MDLA devices such that the detected devices are designated as common LAG partner devices.

31. The machine-readable medium of claim 29, wherein, the common LAG partner device supports Institute of Electrical and Electronic Engineers (IEEE) 802.03ad link aggregation control protocol (LACP) to provide an aggregated link to each of the first and second MDLA devices, respectively.

32. The machine-readable medium of claim 31, wherein, each of the first and second MDLA devices supports IEEE 802.03ad LACP.

33. The machine-readable medium of claim 32, further comprising, exchanging link aggregation control protocol data units (LACPDUS) that are in accordance with IEEE 802.03ad LACP between the first and second MDLA devices to detect devices that are common to both the first and second MDLA devices such that the detected devices are designated as common LAG partner devices.

34. The machine-readable medium of claim 29, further comprising, exchanging system IDs between the first and second MDLA devices, and based upon the system IDs, designating one of the first or second MDLA devices as a master device and the other of the first or second MDLA devices as a slave device.

35. The machine-readable medium of claim 29, further comprising, determining a common key for both the first and second MDLA devices such that the common LAG partner device aggregates links to both the first and second MDLA devices as if both the first and second MDLA devices were a single unitary device.

* * * * *